(12) United States Patent
Stayton (10) Patent No.: US 9,100,087 B2
(45) Date of Patent: Aug. 4, 2015

(54) SYSTEMS AND METHODS FOR PROVIDING SURFACE MULTIPATH MITIGATION

(75) Inventor: Gregory T. Stayton, Peoria, AZ (US)

(73) Assignee: Aviation Communication & Surveillance Systems LLC, Phoenix, AZ (US)

( * ) Notice: Subject to any disclaimer, the term of this patent is extended or adjusted under 35 U.S.C. 154(b) by 401 days.

(21) Appl. No.: 13/206,276

(22) Filed: Aug. 9, 2011

(65) Prior Publication Data
US 2012/0039422 A1    Feb. 16, 2012

Related U.S. Application Data

(60) Provisional application No. 61/371,980, filed on Aug. 9, 2010.

(51) Int. Cl.
*H04B 7/04* (2006.01)
*H04B 7/185* (2006.01)

(52) U.S. Cl.
CPC .......... *H04B 7/18506* (2013.01); *H04B 7/0408* (2013.01)

(58) Field of Classification Search
CPC .......................... H04B 7/18506; H04B 7/0408
USPC ..................................................... 342/29–40
See application file for complete search history.

(56) References Cited

U.S. PATENT DOCUMENTS

| | | | | |
|---|---|---|---|---|
| 3,947,845 A * | 3/1976 | Lyon | | 342/30 |
| 5,181,039 A * | 1/1993 | Oswald et al. | | 342/119 |
| 5,235,336 A * | 8/1993 | Sturm et al. | | 342/30 |
| 5,264,853 A * | 11/1993 | Sturm et al. | | 342/30 |
| 5,629,692 A * | 5/1997 | Stayton et al. | | 340/961 |
| 5,889,491 A * | 3/1999 | Minter | | 342/174 |
| 6,222,480 B1 * | 4/2001 | Kuntman et al. | | 342/30 |
| 6,313,783 B1 * | 11/2001 | Kuntman et al. | | 342/32 |
| 6,469,654 B1 * | 10/2002 | Winner et al. | | 342/33 |
| 7,006,032 B2 * | 2/2006 | King et al. | | 342/29 |
| 7,307,579 B2 * | 12/2007 | Rees et al. | | 342/29 |
| 7,414,567 B2 * | 8/2008 | Zhang et al. | | 342/29 |
| 7,443,334 B2 * | 10/2008 | Rees et al. | | 342/29 |

(Continued)

FOREIGN PATENT DOCUMENTS

| | | | | |
|---|---|---|---|---|
| EP | 1372127 A1 * | 12/2003 | | G08G 5/04 |
| EP | 2604009 A2 * | 6/2013 | | |

(Continued)

OTHER PUBLICATIONS

International Search Report for PCT/US2011/047130, published on May 10, 2012.

(Continued)

*Primary Examiner* — John B Sotomayor
(74) *Attorney, Agent, or Firm* — Allen J. Moss; Squire Patton Boggs (US) LLP (57) ABSTRACT

Multipath mitigation can be performed in a surface environment by various systems and methods. For example, antenna beams from multiple antennas can be used to reduce the impact of multipath on a received signal. Thus, a method can include monitoring for a signal on at least one upper antenna beam of an aircraft. The method can also include monitoring for the signal on at least one lower antenna beam of the aircraft while monitoring on the at least one upper antenna beam. The method can further include processing the signal received by the at least one upper antenna beam and/or the at least one lower antenna beam.

21 Claims, 8 Drawing Sheets

(56) References Cited

U.S. PATENT DOCUMENTS

| | | | |
|---|---|---|---|
| 8,768,540 B2* | 7/2014 | Stone et al. | 701/3 |
| 2003/0186712 A1 | 10/2003 | Tillotson | |
| 2005/0024256 A1* | 2/2005 | Ridderheim et al. | 342/29 |
| 2005/0156777 A1* | 7/2005 | King et al. | 342/29 |
| 2008/0055149 A1* | 3/2008 | Rees et al. | 342/29 |
| 2008/0150784 A1* | 6/2008 | Zhang et al. | 342/30 |
| 2008/0169962 A1* | 7/2008 | Rees et al. | 342/29 |
| 2012/0068877 A1* | 3/2012 | Stayton | 342/30 |

FOREIGN PATENT DOCUMENTS

| | | |
|---|---|---|
| WO | 2007120588 A2 | 10/2007 |
| WO | WO 2012021544 A3 * | 6/2012 |

OTHER PUBLICATIONS

"System Engineering in Wireless Communications: Chapter 9", Wiley Online Library, Nov. 25, 2009.

European Patent Office, Examination Report, mailed Jul. 24, 2014.

* cited by examiner

Figure 1

Figure 2, TCAS Four Antenna Beams

Figure 3, Simultaneous TCAS Reception Pattern

Figure 4, ADS-B Message Preamble

| H1 (ft.) | H2 (ft.) | DG (ft.) | Theta | R1 (ft.) | R2 (ft.) | D' (ft.) | D'-R1-R2 (ft) | Phase Difference |
|---|---|---|---|---|---|---|---|---|
| 33 | 33 | 4850 | 0.013607 | 2425.225 | 2425.225 | 4850 | -0.449051 | -179.150986 |
| 15 | 33 | 4850 | 0.009897 | 1515.699 | 3334.538 | 4850.033402 | -0.204118 | -81.4337608 |
| 15 | 15 | 1000 | 0.029991 | 500.2249 | 500.2249 | 1000 | -0.449899 | -179.48907 |
| 5 | 15 | 1000 | 0.019997 | 250.05 | 750.15 | 1000.049999 | -0.149981 | -59.8356696 |

Figure 5, Large and Small Top/Bottom Antenna Height Multipath

Figure 6, Multipath Object Pulse Reflections

SYSTEMS AND METHODS FOR PROVIDING SURFACE MULTIPATH MITIGATION

CROSS REFERENCE TO RELATED APPLICATIONS

This application is related to and claims the priority of U.S. Provisional Patent Application No. 61/371,980, filed Aug. 9, 2010, the entirety of which is hereby incorporated herein by reference.

BACKGROUND

1. Field

Multipath mitigation can be performed in a surface environment by various systems and methods. For example, antenna beams from multiple antennas can be used to reduce the impact of multipath on a received signal.

2. Description of the Related Art

Many aircraft systems receive Automatic Dependent Surveillance-Broadcast (ADS-B) position, velocity, and identification messages on the ground. Such messages can provide situational awareness and alerting for traffic on runways and taxiways. For example, see RTCA DO-260B (the content of which is hereby incorporated by reference) for more information about ADS-B systems. These systems can experience multi-path signal geometry paths that result in loss of ADS-B signals due to a nulling of signal or due to overlapping that occurs due to reflected signals from the ground or from other object reflective surfaces like buildings. Specifically, in certain environments, both an original signal and a multi-path signal can appear to a receiver with similar amplitudes, thereby either cancelling or otherwise interfering with one another.

SUMMARY

In certain embodiments, a method includes monitoring for a signal on at least one upper antenna beam of an aircraft. The method also includes monitoring for the signal on at least one lower antenna beam of the aircraft while monitoring on the at least one upper antenna beam. The method further includes processing the signal received by the at least one upper antenna beam and/or the at least one lower antenna beam.

A system, in certain embodiments, includes at least one memory including computer instructions and at least one processor. The at least one memory and the computer instructions are configured to, with the at least one processor, cause the system at least to monitor for a signal on at least one upper antenna beam of an aircraft, monitor for the signal on at least one lower antenna beam of the aircraft while monitoring on the at least one upper antenna beam, and process the signal received by the at least one upper antenna beam and/or the at least one lower antenna beam.

According to certain embodiments an aircraft includes at least one upper antenna, at least one lower antenna, and a system. The system includes at least one memory including computer instructions and at least one processor. The at least one memory and the computer instructions are configured to, with the at least one processor, cause the system at least to monitor for a signal on at least one upper antenna beam of the upper antenna, monitor for the signal on at least one lower antenna beam the lower antenna while monitoring on the at least one upper antenna beam, and process the signal received by the at least one upper antenna beam and/or the at least one lower antenna beam.

BRIEF DESCRIPTION OF THE DRAWINGS

For proper understanding of the invention, reference should be made to the accompanying drawings, wherein.

DETAILED DESCRIPTION

Certain embodiments of the present invention, therefore, provide systems and methods for providing surface multipath mitigation. Some such systems and methods can provide multipath mitigation with respect to Automatic Dependent Surveillance-Broadcast (ADS-B) messages.

Figure 1:
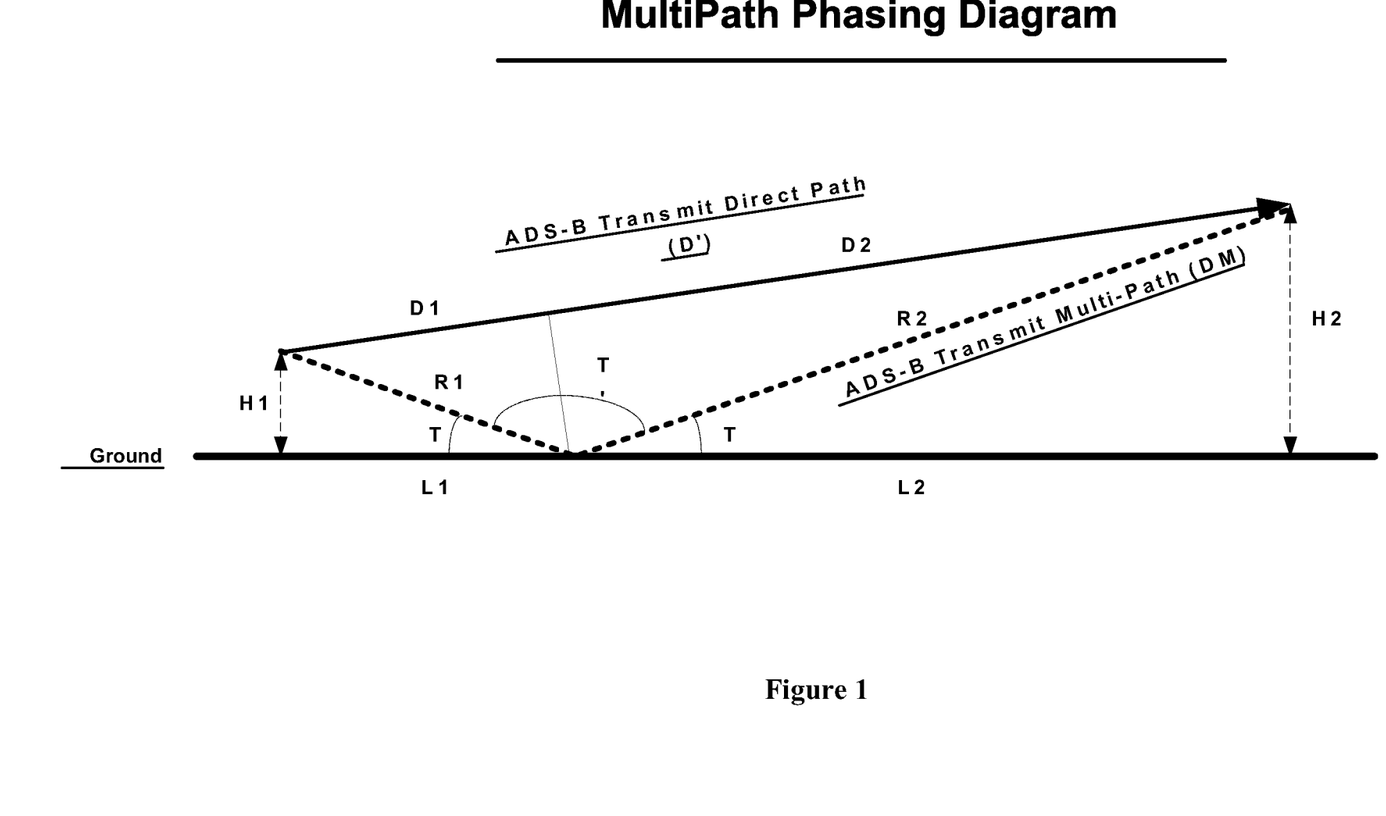
FIG. 1 illustrates a multipath diagram and related equations.

FIG. 1 illustrates a multipath diagram and related equations that can be used to calculate the relative phase of a 1090 MHz Radio Frequency (RF) signal between the direct path (labeled D') and the multipath reflection (labeled DM). An ADS-B direct path signal that may result in a multipath differential phase between the direct and reflected signal of 180 degrees may effectively null out the RF signal at the antenna. In particular, FIG. 1 shows equations that may be utilized by embodiments of the present invention to determine how well multipath mitigation will work when switching to another antenna.

As shown in FIG. 1, height H1 can correspond to the height of a transmitting antenna. H2 can correspond to the height of a receiving antenna. L1 can correspond to the distance (along the ground) from the antenna to where a multipath signal strikes the ground and L2 can correspond to a distance (along the ground) from the place whether the multipath signal strikes the ground to the receiving antenna. R1 corresponds to the length of the path from the transmitting antenna to ground, and corresponds to the square root of the sum of the squares of H1 and L1, according to the Pythagorean Theorem. Likewise, R2 corresponds to the length of the path from the ground to the receiving antenna, and corresponds to the square root of the sum of the squares of H2 and L2, according to the Pythagorean Theorem.

The direct path (D') has an overall path length of D1 combined with D2. Similarly, the multipath path (DM) has an overall path length of R1 combined with R2. Since D' and DM are different lengths, there will be a phase offset in the received signals. This precise phase offset depends on the wavelength of the signal. The wavelength of a 1090 MHz signal may be around 10.8 inches, as explained in FIG. 1. Although the ground is used as the reflecting surface, other reflecting surfaces are also possible, including buildings, other vehicles, and even portions of own aircraft. Thus, the ground reflections should be viewed as a specific example, rather than a limitation.

Note, in FIG. 1, L1=H1/Tan(T), L2=H2/Tan(T); DG=L1+L2=H1/Tan(T)+H2/Tan(T); H1+H1=(L1+L2)Tan(T); Tan $(T)=(H1+H2)/DG$; $T=Tan^{-1}((H1+H2)/DG)$; $T'=180-2*T$; $R1=H1/\sin T$; $R2=H2/\sin T$; $D'^2=(D1+D2)^2=(R1)^2+(R2)^2-2*(R1)*(R2)*\cos(180-2T)$ [Law of Cosines]; $D'=(D1+D2)=[(R1)^2+(R2)^2-2*(R1)*(R2)*\cos(180-2T)]^{1/2}$; $DM=R1+R2$; Phase Error: $[(D'(\text{ft.})-DM(\text{ft.}))/\text{wavelength(ft.)}]*360$ deg; Wavelength of 1090 MHz=c/frequency=$2.997925*10^8/1.090*10^9$ Hz=(0.902358922 ft. or 10.82830707").

Systems and methods consistent with embodiments of the present invention may provide several methods for mitigating the nulled signal due to this type of geometry. One such embodiment is to listen off of one antenna and then to listen off a second antenna for a received signal. In this case, whichever antenna has the strongest signal can be used to receive the ADS-B information. However, if more than one aircraft is sending an ADS-B signal, then it becomes difficult to know when to listen with which antenna at differing signal transmission times from a variety of aircraft.

Another embodiment of the present invention for mitigating the nulled signal may be to listen simultaneously off both antennas, and through separate processing channels, decide which signal is strongest or has the least interference in order to have the best possible reception. Many 1090 MHz ADS-B systems use a Traffic Alert and Collision Avoidance System (TCAS) as a sensor to listen for ADS-B signals. More information about TCAS systems is published in RTCA DO-185 (the content of which is hereby incorporated by reference).

Figure 2:
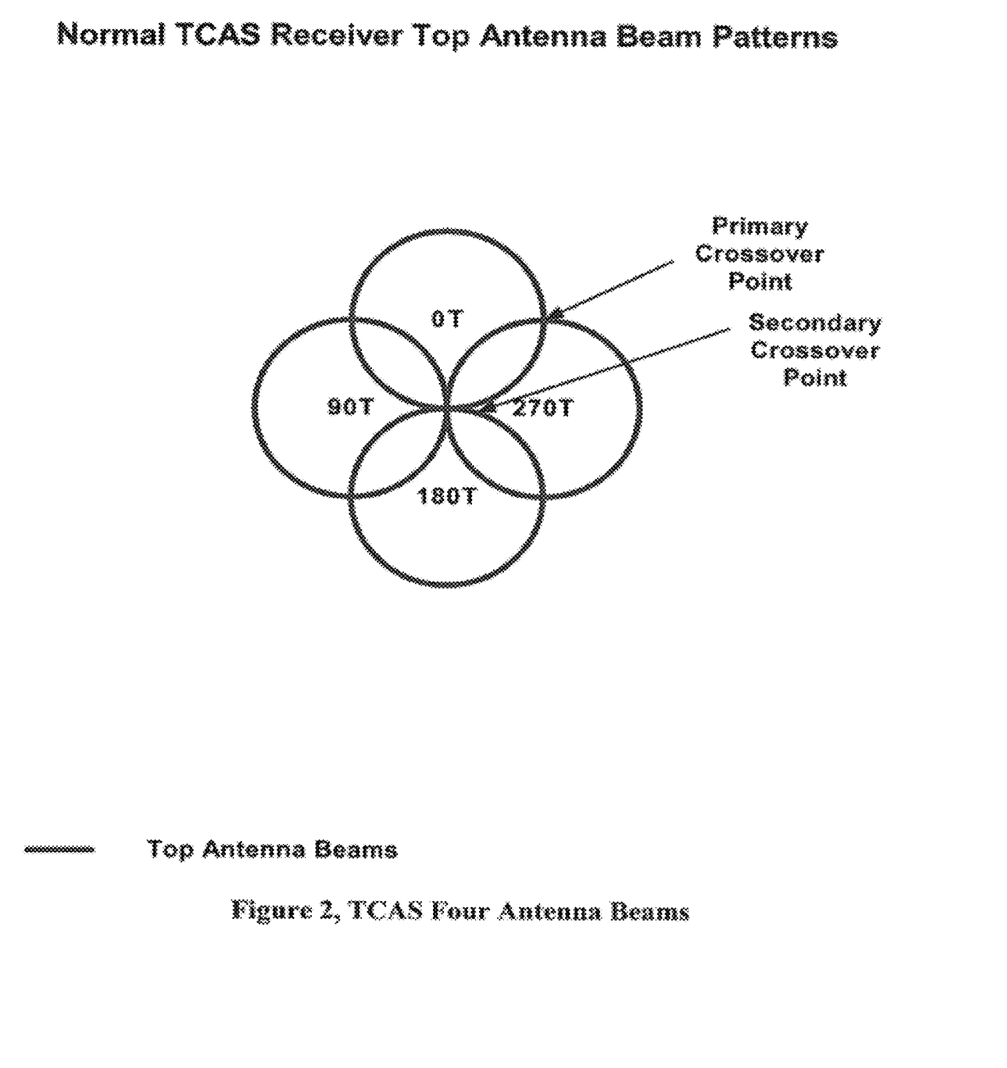
FIG. 2 illustrates a normal TCAS receiver top antenna beam pattern.

A typical TCAS system only has four receivers. These four receivers are conventionally allocated to one four-quadrant antenna at a time for omni-directional listening, with calculated bearing information. Consistent with this aspect of a typical TCAS system, see FIG. 2. FIG. 2 illustrates a normal TCAS receiver top antenna beam pattern.

As shown in FIG. 2, four antenna beams can be formed at various angles with respect to a reference, such as the heading of the aircraft. Thus, as shown, there can be a beam in the zero degree direction, a beam in the 90 degree direction, a beam in the 180 degree direction, and a beam in the 270 degree direction. There are primary crossover points between adjacent beams, and secondary crossover points between opposite beams, as shown. Stylized beams are shown as circles, whereas the beam shape may vary in practice and may include various side lobes.

For ADS-B messages that already include position, for example in the form of a latitude and a longitude, the position information in conjunction with own aircraft position (latitude and longitude, for example) may be used to calculate an accurate bearing. TCAS bearing calculations performed on an identity DF-11 Squitter (non-ADS-B), which are normally used by TCAS to know what the Mode S address of another aircraft is, in order to interrogate that aircraft for a reply (secondary radar surveillance), can be inaccurate. For example, those bearing calculations are typically only used to determine which of the four-quadrant beams to use to interrogate the other aircraft.

Thus, systems and methods consistent with certain embodiments of the present invention can address reception of ADS-B signals differently. For example, for any first pulse received, where it could possibly be the first pulse of an ADS-B preamble, such first pulse received can be used while simultaneously receiving from both top and bottom TCAS antennas to determine whether the top or bottom antenna has the strongest and/or least interference ADS-B signal.

Figure 3:
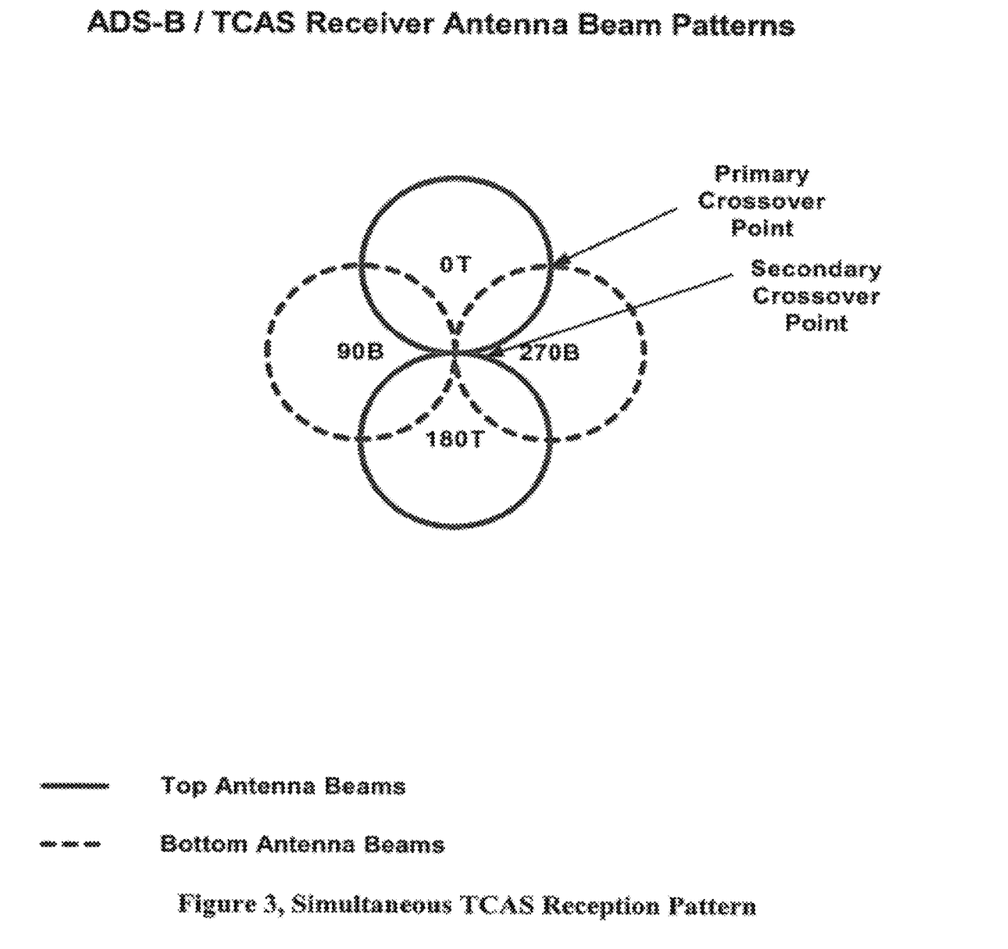
FIG. 3 provides an example of a simultaneous reception pattern, according to an embodiment of the present invention.

FIG. 3 provides an example of a simultaneous TCAS reception pattern employing top and bottom antenna beams, according to an embodiment of the present invention. The 90-270 bottom antenna beams may have a lesser signal strength than the forward (0) or rear (180) top antenna beam. For instance, if the aircraft traffic is at 0 degrees, the 90 or 270 antenna beam may have a signal strength reduced by the amount of the secondary crossover portion of their pattern.

For another example, if the aircraft traffic is at 45 degrees, the 90 and 0 top antenna beam signal strength may be equal. However, if multipath propagation is nulling out the signal to the top antenna, even though the traffic aircraft may be located at 0 degrees, the resultant signal would not be receivable. Nevertheless, the bottom 90-270 antenna beams can be receiving a signal that does not have the same multipath interference characteristics. Once the system determines whether the top or bottom antenna is to be used, that antenna may be solely used for reception of the remainder of the ADS-B signal.

Since, in this example, a TCAS bearing measurement was not determined from the first ADS-B preamble pulse (or the first pulse of an Air Traffic Control Radar Beacon System (ATCRBS) reply), the bearing measurement may not be as accurate, but may be adequate for use by the TCAS logic in determining which quadrant direction to interrogate another aircraft.

Various ways of more accurately determining a TCAS bearing measurement can still be accomplished. For instance, one of the data pulses in the received ADS-B pulse position modulation data block message bits can be used to provide an additional bearing measurement as opposed to obtaining this measurement in the first preamble pulse.

Figure 4:
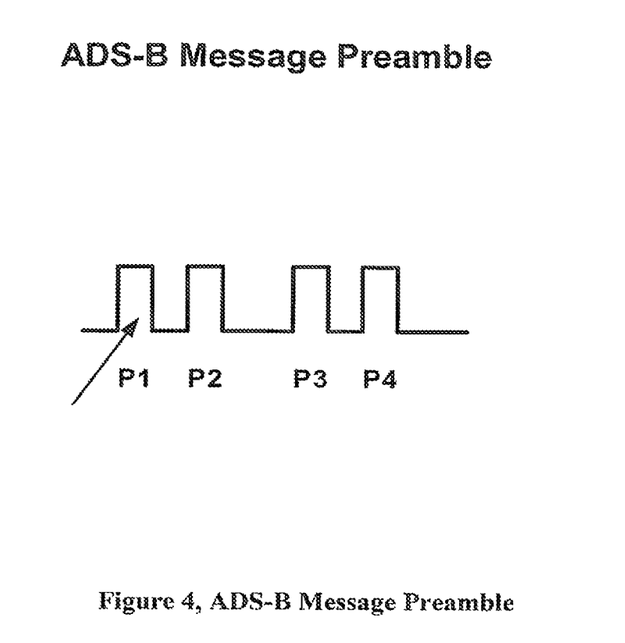
FIG. 4 illustrates an ADS-B message preamble.

FIG. 4 illustrates an ADS-B message preamble. As shown in FIG. 4, an ADS-B message preamble can include four pulses, P1, P2, P3, and P4. During the first pulse, P1, systems and methods according to certain embodiments listen on a top antenna with one or more antenna beams (for example, 0 and 180 degree beams) and on the bottom antenna with one or more antenna beams (for example, 90 and 270 degree beams). These are just examples for which beams can be selected. For example, the number of beams can be more than four total, or the division of beams can be different than indicated above. For example, the 0 and 180 degree beams can be used on the bottom antenna and the 90 and 270 degree beams can be used on the top antenna. Alternatively, two adjacent beams can be used rather than two opposite beams. In a further alternatives, different beam patterns can be used during different time periods. For example, the pattern can be inverted every two seconds.

Note, in FIG. 4, a device can listen on top with 0-180 beams and bottom with 90-270 beams during P1 pulse to determine highest signal strength, or to determine if signal is present on bottom antenna when not present on top antenna.

Figure 5:
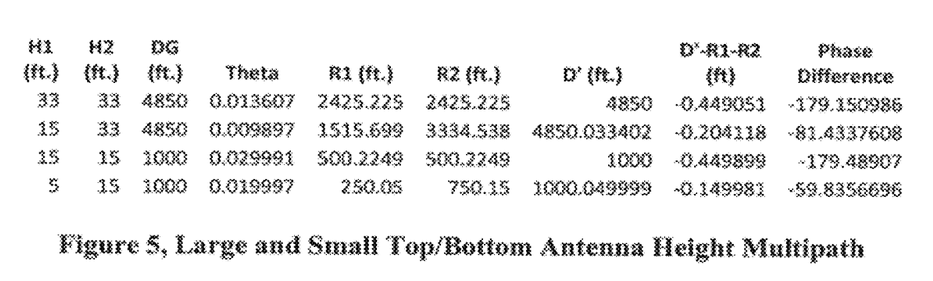
FIG. 5 illustrates comparative phase differences between top and bottom antennas, according to certain embodiments of the present invention.

FIG. 5 illustrates comparative phase differences between top and bottom antennas, according to certain embodiments of the present invention. FIG. 5 demonstrates that for a large aircraft 4850 feet from another aircraft, with a top antenna located approximately 33 feet above ground, the reflected path may result in a phase difference of approximately 180 degrees. This phase difference may null the signal being received at the top antenna. For a bottom antenna located approximately 15 feet above ground and a top antenna located approximately 33 feet above ground, a phase difference can be about −81 degrees. This phase difference for the bottom antenna may allow the signal to be received more successfully by the bottom antenna.

Likewise, for a smaller aircraft with a top antenna located approximately 15 feet above ground and a bottom antenna located approximately 5 feet above ground, the reflected phase angle difference can be calculated based on another aircraft being approximately 1000 feet away. The phase angle difference at the top antenna due to multipath may be about 180 degrees. However, the phase angle difference to the bottom antenna may be about −60 degrees. Therefore, the bottom antenna may allow the signal to be received more accurately than the top antenna.

Figure 6:
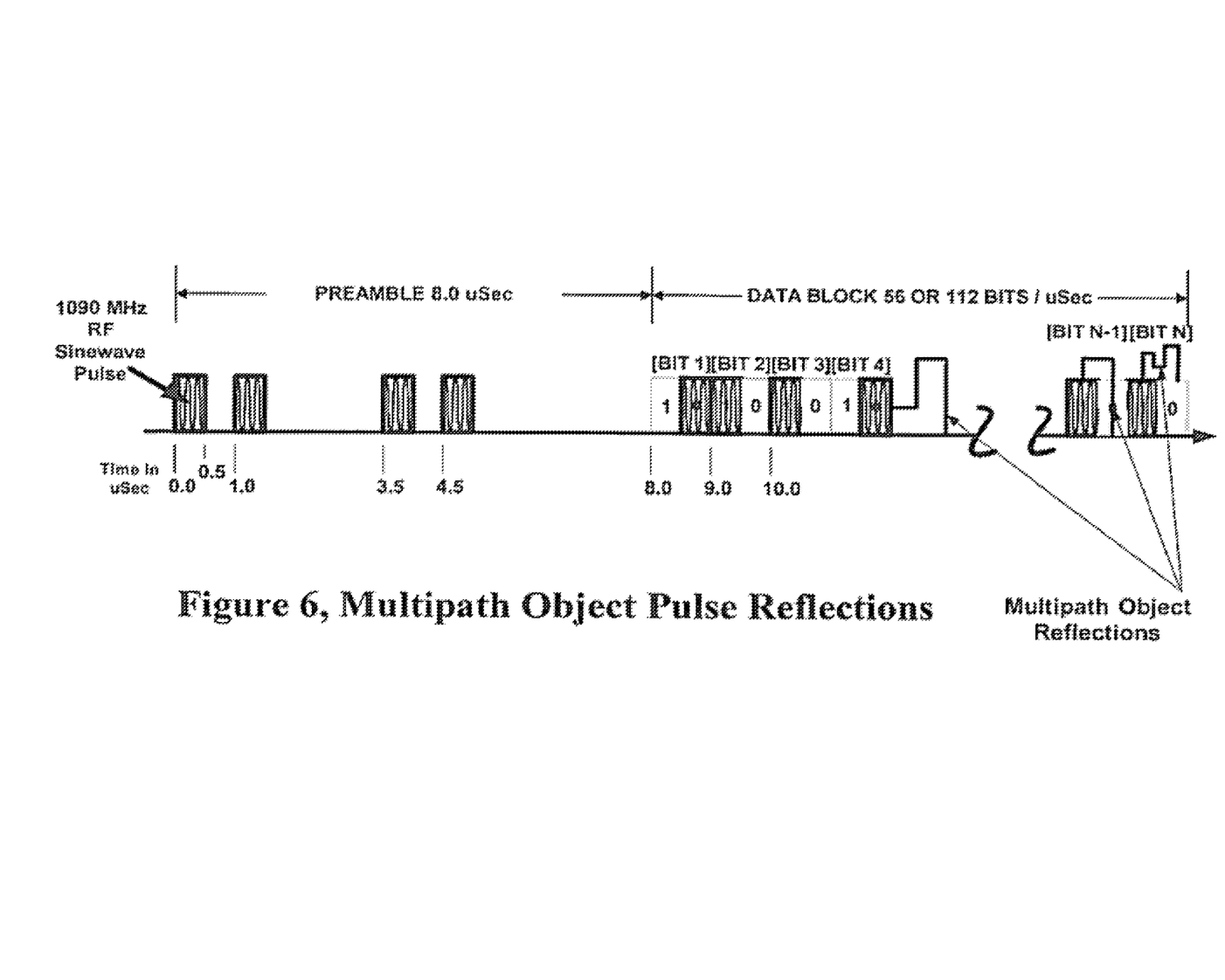
FIG. 6 illustrates a case in which multipath propagation interferes with a direct signal.

FIG. 6 illustrates a case in which multipath propagation interferes with a direct signal. In some cases, the multipath propagation may not be nulling the direct signal, but may nevertheless be interfering with the direct signal. In such cases, further techniques may be used to recover the ADS-B message data from the signal. Systems and methods consistent with embodiments of the present invention may also use ATC Data Overlay to provide parity bits that may be overlay modulated using phase shift keying (PSK) or other suitable modulation on top of the Pulse-Position Modulation (PPM) ADS-B waveform. These overlaid parity bits may then be associated with the correct PPM data bits such that a Reed-Solomon error detection and correction scheme or other method can be used to recover the PPM message. For instance, another method using the overlaid modulation may be used to provide a duplicate set of overlaid message data bits that may be the same as the PPM message data bits. Thus, if the PPM data cannot be recovered, the overlaid data bits may be recovered.

As can be seen in FIG. 6, a preamble of the message can be about 8 microseconds in length, whereas a data block can be about 56 or 112 bits and microsecond, with essentially one bit being transmitted per microsecond. The preamble can include four pulses of one half microsecond duration in two pairs. This is simply an example embodiment of a preamble and a datablock. Other preambles and datablocks are also permitted.

Figure 7:
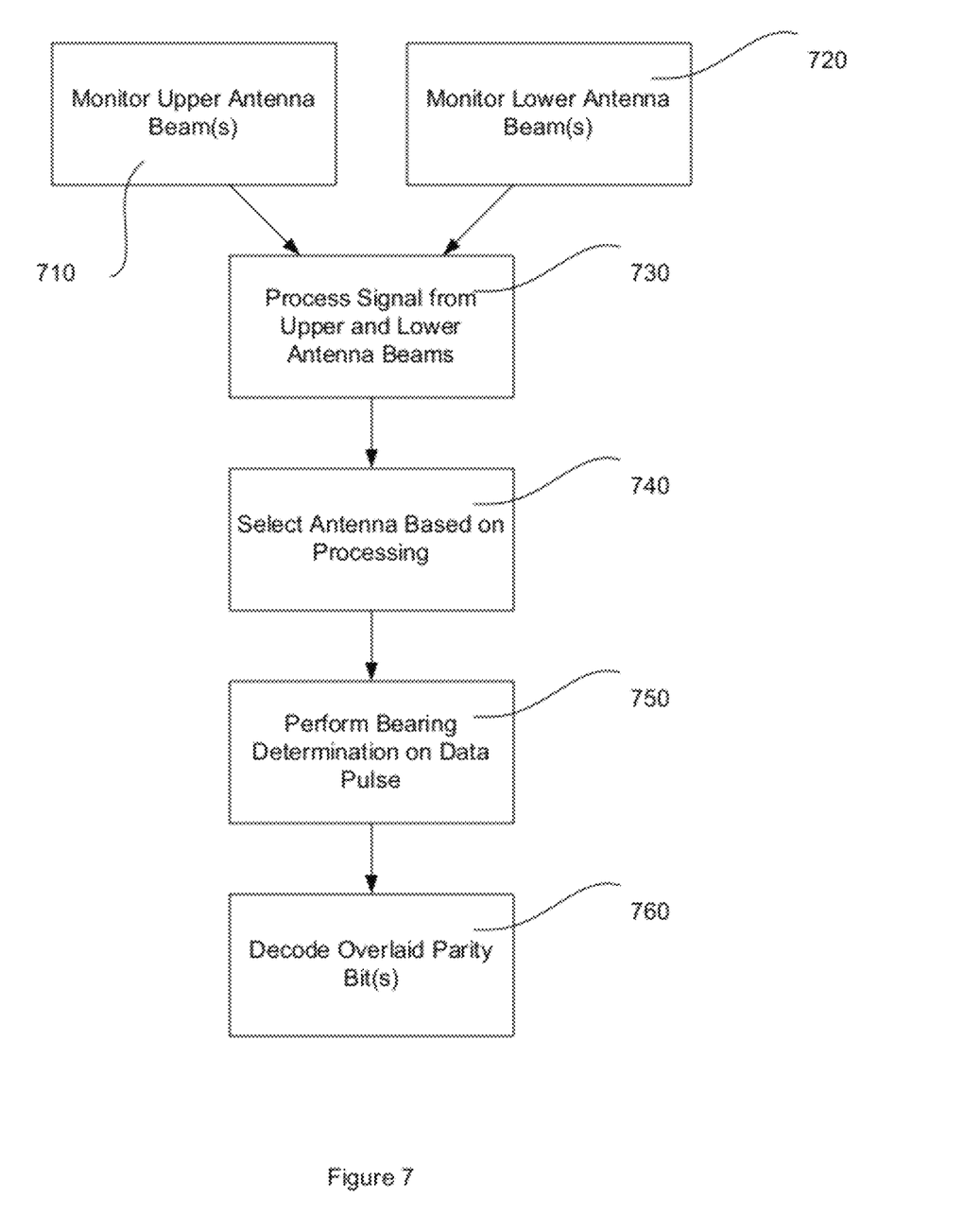
FIG. 7 illustrates a method according to certain embodiments of the present invention.

FIG. 7 illustrates a method according to certain embodiments of the present invention. As shown in FIG. 7, a method can include, at 710, monitoring for a signal on at least one upper antenna beam of an aircraft. The signal can be or include an Automatic Dependent Surveillance-Broadcast (ADS-B) message. The monitoring for the signal on the at least one upper antenna beam can include monitoring for the signal on two antenna beams having opposite bearings.

The method can also include, at 720, monitoring for the signal on at least one lower antenna beam of the aircraft while monitoring on the at least one upper antenna beam. At least one of the at least one lower antenna beam or at least one upper antenna beam can be or include an antenna beam of a Traffic Alert and Collision Avoidance System (TCAS). The monitoring for the signal on the at least one lower antenna beam can include monitoring for the signal on a beam having a bearing approximately orthogonal to a bearing of one of the at least one upper antenna beam. For example, if a beam of the upper antenna has a bearing of zero degrees, a beam of the lower antenna may have a bearing of from eighty to one hundred degrees, or from eighty-five to ninety-five degrees, or within a few degrees of ninety degrees.

The method can further include, at 730, processing the signal received by the at least one upper antenna beam and/or the at least one lower antenna beam. The processing the received signal can involve processing a first pulse of a preamble of a message. The processing can include processing at least two antenna beams of an upper antenna and at least two antenna beams of a lower antenna.

The method can additionally include, at 740, selecting a single antenna upon which to receive a remainder of the signal based on the processing of the signal. The method can also include, at 750, performing a bearing determination on at least one data pulse of the signal. The method can further include, at 760, decoding overlaying modulating parity bits to detect and/or correct at least one error in the signal.

Figure 8:
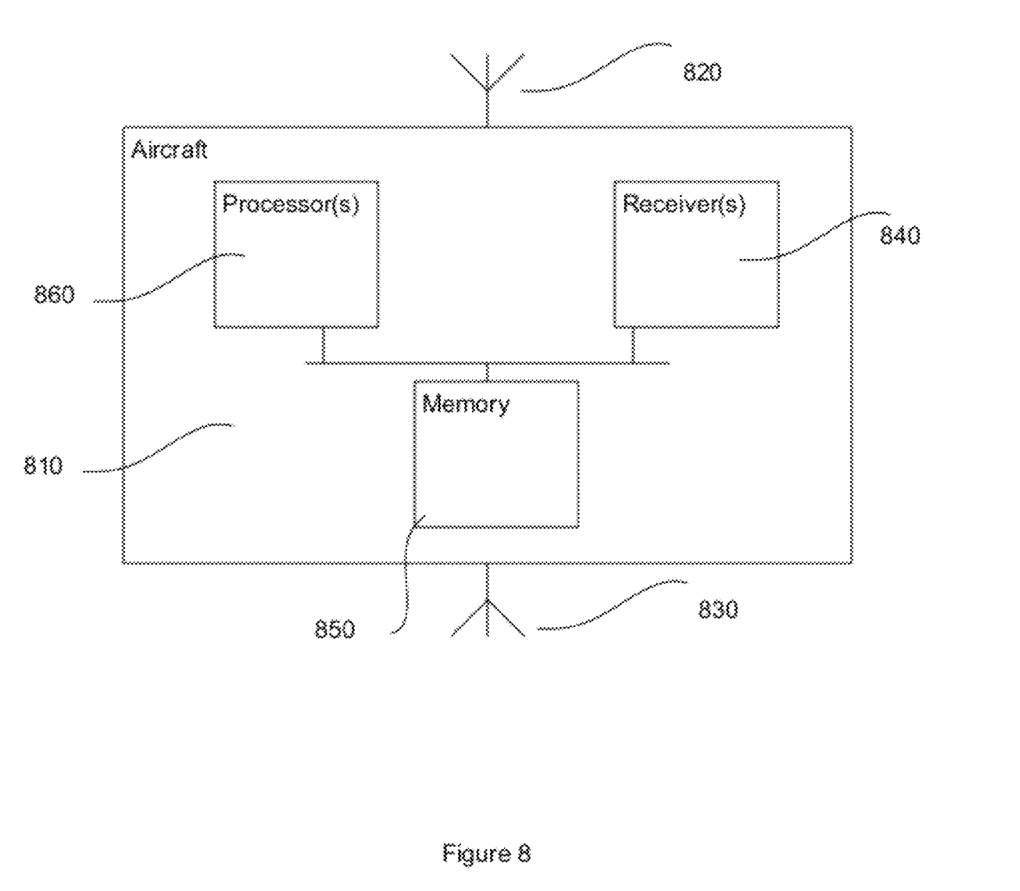
FIG. 8 illustrates an aircraft and system according to certain embodiments of the present invention.

FIG. 8 illustrates an aircraft and system according to certain embodiments of the present invention. As shown in FIG. 8, an aircraft 810 (which can be, for example, an airplane or unmanned aerial vehicle) can include at least one upper antenna 820 (having more than one antenna beam) and at least one lower antenna 830 (having its own antenna beams). The aircraft 810 can be equipped with a system that includes one or more receivers 840, at least one memory 850 including computer instructions, and at least one processor 860. The system is shown as being interconnected by a bus, but any form of interconnection is permitted. The connections to the upper antenna 820 and lower antenna 830 are not shown, but such connections can be provided. In particular, the receivers 840 can be provided to individually receive, on four ports, four antenna beams, in a particular embodiment.

The aircraft 810 and the system therein can be configured to perform the methods described above. For example, the aircraft 810 and the system therein can be configured to perform the methods illustrated in FIG. 7. The system described can be incorporated with or into a TCAS or related avionics equipment. Although the system can include the receivers 840, the system can also be separate from the receivers. For example, the system can be operably connected to the receivers and can control the receivers to perform the appropriate monitoring.

The at least one processor 860 can be variously embodied by any computational or data processing device, such as a central processing unit (CPU) or application specific integrated circuit (ASIC). The at least one processor 860 can be implemented as one or a plurality of controllers.

The at least one memory 850 can be any suitable storage device, such as a non-transitory computer-readable medium. For example, a hard disk drive (HDD) or random access memory (RAM) can be used in the at least one memory 850. The at least one memory 850 can be on a same chip as the at least one processor 860, or may be separate from the at least one processor 860.

The computer program instructions may be any suitable form of computer program code. For example, the computer program instructions may be a compiled or interpreted computer program.

The at least one memory 850 and computer program instructions can be configured to, with the at least one processor 860, cause a hardware apparatus (for example, a TCAS system) to perform a process, such as the process shown in FIG. 7 or any other process described herein. The TCAS may use the one or more radio frequency (RF) receivers 840 to perform monitoring for signals on beam(s) of the upper antenna 820 and beam(s) of the lower antenna 830.

For example, the at least one memory 850 and computer program instructions can be configured to, with the at least one processor 860, cause the apparatus at least to monitor for a signal on at least one upper antenna beam of the aircraft 810, monitor for the signal on at least one lower antenna beam of the aircraft 810 while monitoring on the at least one upper antenna beam, and process the signal received by the at least one upper antenna beam and/or the at least one lower antenna beam.

Thus, in certain embodiments, a non-transitory computer-readable medium can be encoded with computer instructions that, when executed in hardware perform a process, such as one of the processes described above. Alternatively, certain embodiments of the present invention may be performed entirely in hardware.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. A method, comprising:
    monitoring, by at least one receiver of one or more receivers, for a signal on at least one upper antenna beam of an upper antenna of an aircraft, wherein the signal comprises a message encoding data;
    monitoring, by at least one receiver of the one or more receivers, for the signal on at least one lower antenna beam of a lower antenna of the aircraft while simultaneously monitoring on the at least one upper antenna beam; and
    processing, by at least one processor, the signal received by the at least one upper antenna beam, the at least one lower antenna beam, or both the at least one upper antenna beam and the at least one lower antenna beam.

2. The method of claim 1, wherein the processing the signal comprises processing an Automatic Dependent Surveillance-Broadcast (ADS-B) message.

3. The method of claim 1, further comprising:
    selecting, by the at least one processor, a single antenna beam, of the upper antenna beam or the lower antenna beam, upon which to receive a remainder of the signal based on the processing of the signal, the remainder comprising a portion of the signal subsequent to a portion processed in the processing.

4. The method of claim 1, wherein processing the signal comprises processing the signal from an antenna beam of a Traffic Alert and Collision Avoidance System (TCAS).

5. The method of claim 1, wherein the signal comprises a first pulse of a preamble of the message, wherein the processing the signal received comprises processing the first pulse of the preamble of the message.

6. The method of claim 1, further comprising:
    performing, by the at least one processor, a bearing determination on at least one data pulse of the signal.

7. The method of claim 1, wherein the processing comprises processing at least two antenna beams of an upper antenna and at least two antenna beams of a lower antenna.

8. The method of claim 1, wherein the monitoring for the signal on the at least one upper antenna beam comprises monitoring for the signal on two antenna beams having opposite bearings.

9. The method of claim 1, wherein the monitoring for the signal on the at least one lower antenna beam comprises monitoring for the signal on a beam having a bearing approximately orthogonal to a bearing of one of the at least one upper antenna beam.

10. The method of claim 1, further comprising:
    decoding, by the at least one processor, overlaying modulating parity bits of the signal to detect and/or correct at least one reception error in the signal.

11. A system, comprising:
    at least one memory including computer instructions; and
    at least one processor,
    wherein the at least one memory and the computer instructions are configured to, with the at least one processor, cause the system at least to
    monitor, by at least one receiver of one or more receivers, for a signal on at least one upper antenna beam of an upper antenna of an aircraft, wherein the signal comprises a message encoding data;
    monitor, by at least one receiver of the one or more receivers, for the signal on at least one lower antenna beam of a lower antenna of the aircraft while simultaneously monitoring on the at least one upper antenna beam; and
    process the signal received by the at least one upper antenna beam, the at least one lower antenna beam, or both the at least one upper antenna beam and the at least one lower antenna beam.

12. The system of claim 11, wherein the signal comprises an Automatic Dependent Surveillance-Broadcast (ADS-B) message.

13. The system of claim 11, wherein the at least one memory and the computer instructions are further configured to, with the at least one processor, cause the system at least to
    select a single antenna beam, of the upper antenna beam or the lower antenna beam, upon which to receive a remainder of the signal based on the processing of the signal, the remainder comprising a portion of the signal subsequent to a portion processed in the processing.

14. The system of claim 11, wherein at least one of the at least one lower antenna beam or at least one upper antenna beam comprises an antenna beam of a Traffic Alert and Collision Avoidance System (TCAS).

15. The system of claim 11, wherein the signal comprises a first pulse of a preamble of the message, wherein the at least one memory and the computer instructions are configured to, with the at least one processor, cause the system at least to process the signal received by processing the first pulse of the preamble of the message.

16. The system of claim 11, wherein the at least one memory and the computer instructions are further configured to, with the at least one processor, cause the system at least to
    perform a bearing determination on at least one data pulse of the signal.

17. The system of claim 11, wherein the at least one memory and the computer instructions are configured to, with the at least one processor, cause the system at least to process the signal received by processing at least two antenna beams of an upper antenna and at least two antenna beams of a lower antenna.

18. The system of claim 11, wherein the at least one memory and the computer instructions are configured to, with the at least one processor, cause the system at least to monitor for the signal on the at least one upper antenna beam by monitoring for the signal on two antenna beams having opposite bearings.

19. The system of claim 11, wherein the at least one memory and the computer instructions are configured to, with the at least one processor, cause the system at least to monitor for the signal on the at least one lower antenna beam by monitoring for the signal on a beam having a bearing approximately orthogonal to a bearing of one of the at least one upper antenna beam.

20. The system of claim 11, wherein the at least one memory and the computer instructions are configured to, with the at least one processor, cause the system at least to
    decode overlaying modulating parity bits of the signal to detect and/or correct at least one reception error in the signal.

21. An aircraft, comprising:
    at least one upper antenna;
    at least one lower antenna; and
    a system, the system comprising:
        at least one memory including computer instructions; and at least one processor, wherein the at least one memory and the computer instructions are configured to, with the at least one processor, cause the system at least to monitor, by at least one receiver of one or more receivers, for a signal on at least one upper antenna beam of the upper antenna, wherein the signal comprises a message encoding data;

monitor, by at least one receiver of the one or more receivers, for the signal on at least one lower antenna beam of the lower antenna while simultaneously monitoring on the at least one upper antenna beam; and process the signal received by the at least one upper antenna beam, the at least one lower antenna beam, or both the at least one upper antenna beam and the at least one lower antenna beam.

\* \* \* \* \*